US007296537B2

(12) United States Patent
Burghardi et al.

(10) Patent No.: US 7,296,537 B2
(45) Date of Patent: Nov. 20, 2007

(54) COMPUTER SYSTEM FOR DETERMINING A CUSTOMIZED ANIMAL FEED

(75) Inventors: Steve R. Burghardi, Eden Prairie, MN (US); Brian J. Knudson, Chanhassen, MN (US); Loren Peterson, Loretto, MN (US); David A. Cook, Coon Rapids, MN (US); Mark A. Oedekoven, Minneapolis, MN (US)

(73) Assignee: CAN Technologies, Inc., Minnetonka, MN (US)

( * ) Notice: Subject to any disclaimer, the term of this patent is extended or adjusted under 35 U.S.C. 154(b) by 0 days.

(21) Appl. No.: 11/348,298

(22) Filed: Feb. 6, 2006

(65) Prior Publication Data

US 2006/0283393 A1 Dec. 21, 2006

Related U.S. Application Data

(63) Continuation of application No. 10/985,365, filed on Nov. 10, 2004, now abandoned, which is a continuation of application No. 10/715,053, filed on Nov. 17, 2003, now Pat. No. 6,863,023, which is a continuation of application No. 09/739,550, filed on Dec. 15, 2000, now Pat. No. 6,681,717.

(51) Int. Cl.
*A01K 5/00* (2006.01)

(52) U.S. Cl. .................................... 119/51.02
(58) Field of Classification Search ............. 119/51.02, 119/53, 52.4, 57.92; 702/19, 179, 181, 184, 702/183, 182
See application file for complete search history.

(56) References Cited

U.S. PATENT DOCUMENTS 4,463,706 A    8/1984   Meister et al.

| 4,493,290 A | 1/1985 | Gibbard |
| 4,498,424 A | 2/1985 | Leuschner |
| 4,517,923 A | 5/1985 | Palmer |
| 4,532,892 A | 8/1985 | Kuzara |
| 4,589,372 A | 5/1986 | Smith |

(Continued)

FOREIGN PATENT DOCUMENTS

EP    0 715 806 A1    6/1996

(Continued)

OTHER PUBLICATIONS

Black et al., "Simulation of energy and amino acid utilisation in the pig," *Research and Development in Agriculture*, vol. 3, No. 3, 1986 (pp. 121-145).

(Continued)

*Primary Examiner*—Yvonne R. Abbott
(74) *Attorney, Agent, or Firm*—Foley & Lardner LLP

(57) ABSTRACT

A method and system for creating a customized animal feed is disclosed. The method and system include having ingredient data from more than one location, animal data, evaluation data, and optimization weighting data. The specifications for a customized feed are generated using ingredient data representative of the mix of ingredients available at one or more locations. A customized feed is generated which is designed to fulfill the nutritional requirements for the animal's diet. The nutritional requirements are derived from the animal data. Furthermore, the feed is optimized based upon the profile data, the feed data, the evaluation data, and the optimization weighting data.

33 Claims, 3 Drawing Sheets

U.S. PATENT DOCUMENTS

| | | | |
|---|---|---|---|
| 4,712,511 A | 12/1987 | Zamzow et al. | |
| 4,729,894 A | 3/1988 | Teeter | |
| 5,105,767 A | 4/1992 | Gordon et al. | |
| 5,174,244 A | 12/1992 | Gaalswyk | |
| 5,309,864 A | 5/1994 | Harmsen et al. | |
| 5,355,833 A | 10/1994 | Legrain | |
| 5,374,524 A | 12/1994 | Miller | |
| 5,474,085 A | 12/1995 | Hurnik et al. | |
| 5,478,989 A | 12/1995 | Shepley | |
| 5,579,719 A | 12/1996 | Hoff et al. | |
| 5,595,444 A | 1/1997 | Tong et al. | |
| 5,636,118 A | 6/1997 | Brewster et al. | |
| 5,668,718 A | 9/1997 | Liu et al. | |
| 5,673,647 A | 10/1997 | Pratt | |
| 5,700,590 A | 12/1997 | Masor et al. | |
| 5,816,191 A | 10/1998 | Beaudoin et al. | |
| 5,843,498 A | 12/1998 | Takahashi | |
| 5,878,402 A | 3/1999 | Brewster et al. | |
| 5,901,660 A | 5/1999 | Stein | |
| 6,076,043 A | 6/2000 | Liu | |
| 6,082,304 A | 7/2000 | Crain | |
| 6,115,692 A | 9/2000 | Liu et al. | |
| 6,135,055 A | 10/2000 | Pratt | |
| 6,314,909 B1 | 11/2001 | Horwood | |
| 6,394,963 B1 | 5/2002 | Blazey et al. | |
| 6,556,948 B1 | 4/2003 | McKenna | |
| 6,658,308 B1 | 12/2003 | van de Ligt et al. | |
| 6,681,717 B2 | 1/2004 | Burghardi et al. | |
| 6,805,074 B2 | 10/2004 | Newcomb et al. | |
| 6,868,804 B1 | 3/2005 | Huisma et al. | |
| 6,895,893 B2 | 5/2005 | Larsen | |
| 2002/0007798 A1* | 1/2002 | Pavlak et al. | 119/51.01 |
| 2002/0082486 A1 | 6/2002 | Lavery et al. | |
| 2004/0098209 A1 | 5/2004 | Burghardi et al. | |

FOREIGN PATENT DOCUMENTS

| | | |
|---|---|---|
| HU | 209 360 A | 5/1994 |
| WO | WO 00/41575 A1 | 7/2000 |
| WO | WO 01/54043 A1 | 7/2001 |
| WO | WO 01/89285 A2 | 11/2001 |
| WO | WO 02/02822 A2 | 1/2002 |
| WO | WO 02/47473 A2 | 6/2002 |

OTHER PUBLICATIONS

Cant, J.P., "Modeling Milk Composition," Department of Animal and Poultry Science, University of Guelph, Canada, undated (8 pp.).

Chavas et al., "Modeling Dynamic Agricultural Production Response: The Case of Swine Production," *Amer. J. Agr. Econ.*, vol. 67, No. 3, Aug. 1985 (pp. 636-646).

Derwent Abstract of EP 0715 806 A1; Accension No. 1996-260514 (2 pp.).

Derwent Abstract of SU 843 889; Accension No. 1982-E5977E (1 p.).

Devresse, "Nutrient Levels in Some Commercial Shrimp Feeds and Feed Ingredients of Asia and Latin America—A Comparative Analysis," Inve Aquaculture N.V.Oeverstraat, 7 B-9200 Belgium, available at least by Aug. 6, 2001 (pp. 49-70).

D'Mello, "Utilization of dietary purines and pyrimidines by non-ruminant animals," *Proc. Nutr. Soc.*, vol. 41, 1982 (pp. 301-308).

Emmans. "The growth of turkeys" (pp. 135-166).

Fisher et al., "A Model for the Description and Prediction of the Response of Laying Hens to Amino Acid Intake," *Br. Poult. Sci.*, vol. 14, 1973 (pp. 469-484).

Howie, "Condensed Porcine Solubles® suitable source of energy, protein for swine," Feedstuffs, Oct. 26, 1998, The Miller Publishing Company, a company of Rural Press Ltd. (2 pp.).

Hungarian Patent Office, Novelty Search Report for Hungarian Application No. P0302586, Mar. 25, 2004 (1 p.).

JP 9028678, "Apparatus for Determining Stress", Partial English Translation of Abstract, Publication Date Feb. 4, 1997, available at esp@cenet database (1 p.).

JP 8052116, "Diagnostic Support System by Skin Temperature of Horse", Partial English Translation of Abstract, Publication Date Feb. 27, 1996, available at esp@cenet database (1 p.).

Karasawa et al., "Effect of Dietary RNA on Growth and Food Intake of Young Chicks", *Jpn. Poult. Sci.*, vol. 27, vol. 3, 1990 (pp. 165-172).

Kilpatrick et al., "A predictive model for beef cattle growth and carcass composition", *Agricultural Systems*, vol. 61, 1999 (pp. 95-107).

Kubota et al., "Adverse Effects of Low Concentrations of Dietary RNA Addition on the Growth, Food Intake and Kidney Weight of Young Chickens", *British Poultry Science*, vol. 35 1994 (pp. 585-588).

"Orotate supplementation for starter diet for swine", vol. 61, 1995, Nutri-Quest, Inc., 1400 Elbridge Payne Road, Chesterfield, MO 63017 (2 pp.).

Schematic representation of computer system commercially used by Cargill, Inc. prior to Jun. 2001 (Figures 1-3 from WO 02/47473) (3 pp.).

Schematic representation of computer system commercially used by Cargill, Inc. prior to Dec. 1999 (1 p.).

Talpaz et al., "Dynamic Optimization Model for Feeding of Broilers", *Agricultural Systems*, vol. 20, 1986 (pp. 121-132).

"What's all this noise about nucleotides?", *Feeding Times*, vol. 6, No. 2, 2001 (pp. 18-19).

\* cited by examiner

COMPUTER SYSTEM FOR DETERMINING A CUSTOMIZED ANIMAL FEED

CROSS REFERENCE TO RELATED PATENT APPLICATIONS

This application is a continuation of application Ser. No. 10/985,365, filed Nov. 10, 2004 now abandoned, which is a continuation of application Ser. No. 10/715,053, filed Nov. 17, 2003, now U.S. Pat. No. 6,863,023, which is a continuation of application Ser. No. 09/739,550, filed Dec. 15, 2000, now U.S. Pat. No. 6,681,717.

FIELD OF THE INVENTION

The present invention relates to a computerized system for determining a customized feed for animals, such as cattle, swine, poultry, fish, crustaceans and the like. In particular, the system determines a feed mix based upon data relating to information such as animal characteristics, available ingredients, speed of product production, and cost of production.

BACKGROUND

In food production, and specifically producing animal products such as milk, beef, pork, eggs, chicken, fish etc., there is need to improve production efficiency. Production efficiency, i.e. producing the maximum quantity of animal products while minimizing the time and cost of production for those products, is important in maintaining a competitive advantage.

A producer (i.e. a farmer, rancher, pork producer, and the like) generally wants to maximize the amount of animal product produced (e.g. gallons of milk, pounds of beef or pork produced) while keeping the costs associated with feed at a low level in order to achieve maximum animal productivity. The maximized amount of animal product should be produced at a minimized cost to the producer. Costs to the producer include the cost of feed needed to produce the animal products, as well as the costs of related equipment and facilities needed in the production of animal products. In order to minimize the effect of fixed costs associated with equipment and facilities, the maximum amount of animal product should preferably be produced in a minimum time period.

Producers are constantly trying to increase these production efficiencies. One way of increasing production efficiencies is by altering the feed which animals are fed. For example, a feed with certain amounts of nutrients can cause an animal to grow or produce animal products quickly and/or perform better, whereas a different feed with different amounts of nutrients may cause an animal to grow or produce animal products on a more cost effective basis.

Current systems for creating animal feed are not fully capable of helping producers evaluate and improve production efficiencies. Current systems commonly generate an overall nutrient profile which is related to a set of animal characteristics. Such systems then look at the overall nutrient profile and compare what nutrients may be had from the on-farm ingredients. From this comparison, a "nutritional gap" can be calculated, i.e., the nutritional requirements that the producer needs to fulfill his production goals after accounting for the use of his on-site feed. This nutritional gap is then compared to the nutritional components which may be available from ingredients located at a supplier's mill. Through a comparison of the nutritional gap and the nutritional components available from the mill, current systems allow a supplier to provide a cost effective custom feed which is optimized to permit an animal to produce desired animal products on a cost minimized basis.

Currently systems exist that are capable of taking the amounts of on-farm ingredients to be used in the overall diet of the animal into account. This is typically done by accounting for the on-farm component of the animal's diet as a fixed input parameter in the determination. It would be advantageous to be able to modify the amounts of on-farm ingredients to be used in forming the custom feed as part of the optimization process. Moreover, current systems are generally limited to generating the custom feed based on a single evaluation criteria, typically based on the cost of the feed (e.g., on a cost of feed per unit of animal weight gain basis). It would be advantageous to have a system which is capable of utilizing more than one evaluation criteria in generating the custom feed.

SUMMARY

One embodiment of the present invention provides a system for determining customized feed for animals, such as farm livestock, poultry, fish and crustaceans. The system stores animal data representative of the characteristics of the animal, feed data representative of the feed ingredients located at one or more locations, and evaluation data representative of at least one evaluation criteria. The evaluation criteria are generally related to factors representative of animal productivity. An optimization weighting is used to indicate the weight assigned to the evaluation criteria. Examples of evaluation criteria include (i) animal production rate (e.g., the rate of animal weight gain or the rate of production of a food product such as milk or eggs); (ii) cost of feed per unit animal weight gain; and (iii) feed weight per unit animal weight gain. The system includes a data processing circuit, which may be one or more programmed microprocessors, in communication with a data storage device or devices which store the data. The data processing circuit is configured to generate profile data representative of a nutrient profile for the animals based upon the animal data. In effect, the nutrient profile is a description of the overall diet to be fed to the animals defined in terms of a set of nutritional parameters ("nutrients"). Using the profile data, the data processing circuit generates ration data representative of a combination of ingredients from one or more locations. The ration data is generated by the data processing circuit based upon the profile data, the feed data, the evaluation data, and the optimization weighting data.

Another embodiment of the system includes system for determining customized feed for at least one animal. The system includes first memory means for storing animal data representative of the characteristics of the animal, second memory means for storing feed data representative of the feed ingredients located at at least one location, third memory for storing evaluation data representative of at least two evaluation criteria, and processing means for generating profile data representative of a nutrient profile for the animal based upon the animal data, processing means further generating ration data representative of a combination of ingredients from the location, the ration data being generated by the processing means based upon the profile data, the feed data and the evaluation data. The system further includes fourth memory means for storing optimization weighting data representative of the effect a respective evaluation criteria has on the generation of the ration data, the processing means further generating the ration data based upon the optimization weighting data.

A further embodiment of the present invention provides a method for determining customized feed for at least one animal. The method includes storing animal data representative of the characteristics of the animal, storing feed data representative of the feed ingredients located at at least one location, storing evaluation data representative of at least two evaluation criteria, storing optimization weighting data representative of the effect a respective evaluation criteria, generating profile data representative of a nutrient profile for the animal based upon the animal data; and generating ration data representative of a combination of ingredients from the location, the ration data being generated based upon the profile data, the feed data, the evaluation data, and the optimization weighting data.

As modifications to the embodiments described herein, systems and/or methods may rely on more than one optimizing criteria and/or feed data representative of ingredients located at more than one location. For example, ingredients which could be used to create the ration may be located at the farm associated with the animals as well as at the mill of an ingredient supplier. Depending upon the requirements of the system, processing can be consolidated in one processor or divided between processors in communication via a network such as a LAN or the Internet. Furthermore, the processors may be located in devices such as workstations, portable PC's and/or hand held computers.

In other variations of the embodiments described herein, the systems and/or methods may further include a memory portion in communication with the digital processor which stores variation data representative of a range for one or more nutrients of the nutrient profile. The digital processor is capable of generating a set of ration data based upon the variation data. A memory portion of the system may store variation data which corresponds to preselected incremental variations for the values assigned to one or more individual nutrients in the nutritional profile.

Throughout this application, the text refers to various embodiments of the system and/or method. The various embodiments described are meant to provide a variety of exemplary examples and should not be construed as descriptions of alternative species. Moreover, it should be noted that the descriptions of the various embodiments provided herein may be of overlapping scope. The embodiments discussed herein are merely illustrative and are not meant to limit the scope of the present invention.

DETAILED DESCRIPTION

An exemplary system, and process which can be used in producing a customized feed for animals, such as livestock, poultry, fish or crustaceans is described herein. How the system and process can increase production efficiencies by customizing feed is also disclosed. It is particularly desirable if the system and methods are capable of determining an optimized feed using one or more evaluation criteria. Examples of suitable evaluation criteria include a feed cost per unit animal weight gain basis, an animal production rate basis (e.g., based upon a rate of animal weight gain or a rate of production of an animal product, such as milk or eggs), and a feed amount per unit of animal weight gain basis.

In one embodiment of the present system, a computer system may be used which has a processing unit that executes sequences of instructions contained in memory. More specifically, execution of the sequences of instructions causes the processing unit to perform various operations, which are described herein. The instructions may be loaded into a random access memory (RAM) for execution by the processing unit from a read-only memory (ROM), a mass storage device, or some other persistent storage. In other embodiments, hardwired circuitry may be used in place of, or in combination with, software instructions to implement the present method. Thus, the embodiments described herein are not limited to any specific combination of hardware circuitry and/or software, nor to any particular source for the instructions executed by the computer system.

Figure 1:
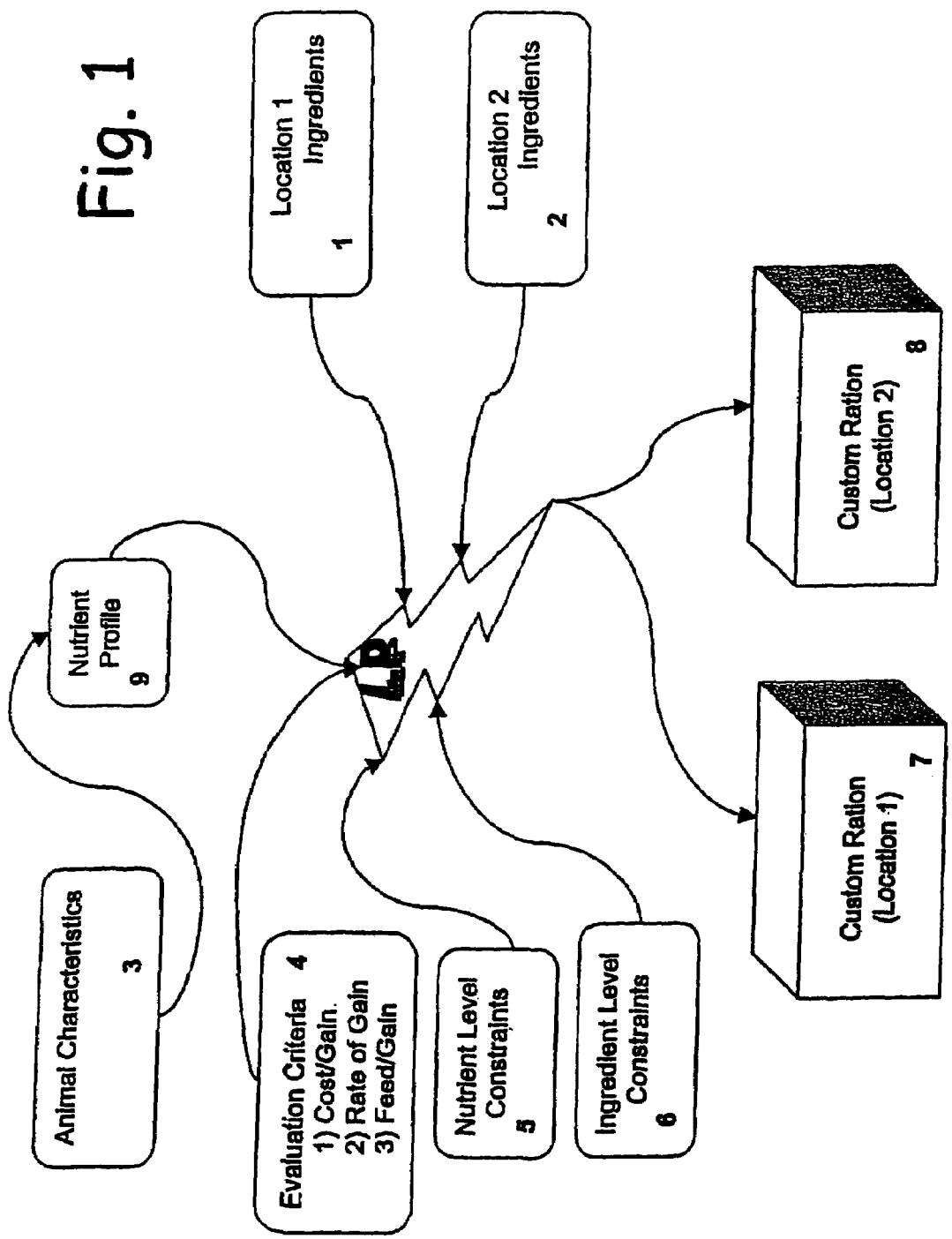
FIG. 1 is a general schematic representation of the data flow in one embodiment of the present System.

Creating a customized feed typically involves processing and manipulating at least four basic data sets (see, e.g., FIG. 1): first feed data representative of the collection of ingredients located at a first location 1, second feed data representative of the collection ingredients located at a second location 2, animal data representative of characteristics of the animal 3 (e.g., parameters related to its genotype, production level, environment and/or feeding regime), and evaluation criteria 4. As will be explained below, very often first and second feed data representative of sets of ingredients located at an on-farm site (first ingredients 1 located at a first location) and ingredients located at a supplier's mill site (second ingredients 2 located at a second location) are used to generate the recommended mix of ingredients to be fed to the animal. In many instances, the ration data define an overall diet for the animal which includes custom rations from more than one location (e.g., a custom ration from a first location 7 and a custom ration from a second location 8 as depicted in FIG. 1). These can be combined to create a customized feed ("ration") which fulfills the animal data requirements while meeting the evaluation criteria 4.

The evaluation criteria may be chosen from such suitable criteria related to animal productivity as (i) animal production rate, (ii) cost of feed per unit animal weight gain, and (iii) feed weight per unit animal weight gain.

In some modified embodiments, the present system may include additional memory portions for storing nutrient level constraints 5 and/or ingredient level constraints 6. This may be useful where, for example, it has been established that higher levels of certain nutritional components could pose a risk to the health of an animal being fed the custom feed. For example, if the custom feed includes some trace minerals, such as selenium, present in too great an amount, the custom feed may have adverse health consequences to the animal. Various embodiments of the present invention allow constraints to be placed on the maximum and/or minimum amounts of one or more nutrients in the profile data generated. In some embodiments, this may be used together with the animal data as a basis to calculate the profile data. These constraints may be stored in a memory location as part of the system or the system may permit an individual operator to input one or more constraints on the amount of particular nutrient(s) in the profile data generated by the system.

Similarly, it may be desirable to limit the amounts of one or more ingredients in either a custom product mix or in the overall diet to be fed to the animal. For example, for ease of formulation of a custom feed in pellet form it may be desirable to limit the amount of certain ingredients and/or require the inclusion of minimum amounts of specified ingredients.

The first data set that is generally input into the system and subsequently stored in a memory portion includes data representative of characteristics of the animal. Examples of types of data representative of animal characteristics ("animal data") include beginning weight of the animal; a desired weight of the animal; an environment of the animal; a feed form; an actual or desired production level of the animal; and a relationship of animal muscle to fat of the animal. For example, the nutrient profile generated for a particular animal can vary based upon a number of different characteristics of the animal relating to one or more of its genotype, environment, current condition (e.g., defined in terms of health and/or weight), desired production level, feed form (e.g., meal or pellet), current production level, desired final condition (e.g., defined in terms of final weight and/or relationship of animal muscle to fat of the animal) and the like. Tables 1 and 2 below list illustrative sets of animal characteristics which can be used as a basis to generate nutritional profiles to be used in designing custom rations ("custom feeds") for swine and dairy cattle, respectively.

TABLE 1

Animal Characteristics Suitable for Generating
a Nutritional Profile for a Feed for Swine

| | |
|---|---|
| Animal Category | Genotype (lean gain) |
| Finisher | Effective Ambient Temperature |
| Gilt Replacement | Temperature |
| Grow | Draft |
| Prebred | Bedding |
| Sow | % of pigs that are wet) |
| Gestation | Pigs per pen |
| Lactation | Pig density (square feet per pig) |
| Artificial Insemination Boar | Health |
| Begin Weight | Flooring Type |
| End Weight | Total pigs born/litter |
| Feed Disappearance (Intake) | Litter weight gain |
| Feed Wastage | Total pigs born/litter |
| Feed Form | |

TABLE 2

Animal Characteristics Suitable for Generating
a Nutritional Profile for Dairy Cattle

| | |
|---|---|
| Target Milk Weight (volume) | Body Weight |
| Target Milk Butterfat % | Body Weight Change |
| Target Milk Protein % | Body Condition Score (current) |
| Current Milk Weight (volume) | Body Condition Score (desired) |
| Current Milk Butterfat % | Actual Dry Matter Intake |
| Current Milk Protein % | Environmental Temperature |
| Percent of group in first lactation | Environmental Humidity |
| Percent of group in second lactation | Genotype |

The animal data representative of the characteristics of the animal may be inputted into a computer system with a memory portion available and configured to store the data. The animal data representative of the characteristics of the animal may be inputted into the system by a variety of methods known to those skilled in the art including a keyboard, mouse, touchpad, computer, internet or other related device.

The system includes a data processing circuit which is configured to generate profile data representative of a nutrient profile for the animals based upon the animal data. In effect, the nutrient profile is a description of the overall diet to be fed to the animals defined in terms of a set of nutritional parameters ("nutrients"). Depending on the desired degree of sophistication of the system, the profile data may include a relatively small set of amounts of nutrients or large number of amounts of nutrients. Table 3 includes an illustrative list of nutrients that may be used delineating profile data for animals such as pigs and dairy cattle. Of course, the list of nutrients used in generating profile data may differ for different types of livestock or other animals. Tables 4 and 5 respectively contain lists of nutrients suitable for use in generating nutritional profiles for swine and dairy cattle, respectively.

The data processing circuit in the present system is also configured to generate ration data representative of a combination of ingredients from one or more locations. The ration data is generated by the data processing circuit based upon the profile data, feed data representative of the feed ingredients available at the location(s) and evaluation data representative of one or more evaluation criteria.

TABLE 3

Nutrients Suitable for Generating
a Nutritional Profile

| | |
|---|---|
| Animal Fat | Rumres Nfc |
| Ascorbic Acid | Salt |
| Biotin | Selenium |
| Cal/Phos | Simple Sugar |
| Chloride | Sodium |
| Choline | Sol Rdp |
| Chromium | Sulfur |
| Cobalt | Sw Obs Me |
| Copper | Thiamine |
| Arginine (Total and/or Digestible) | Total Rdp |
| Cystine (Total and/or Digestible) | Verified Adf |
| Isoleucine (Total and/or Digestible) | Verified Ash |
| Leucine (Total and/or Digestible) | Verified Calcium |
| Lysine (Total and/or Digestible) | Verified Dry Matt |
| Methionine (Total and/or Digestible) | Verified Fat |
| Phenylalanine (Total and/or Digestible) | Verified Fiber |
| Threonine (Total and/or Digestible) | Verified Hemi |
| Tryptophan (Total and/or Digestible) | Verified Moisture |
| Valine (Total and/or Digestible) | Verified Ndf |
| Folic Acid | Verified Neg |
| Phosphate | Verified Nel |
| Iodine | Verified Nem |
| Iron | Verified Nfc |
| Lactose | Verified Phos |
| Lasalocid | Verified Protein |
| Magnesium | Verified Rup |
| Manganese | Vitamin A |
| Monensin | Vitamin B12 |
| Niacin | Vitamin B6 |
| Potassium | Vitamin D |
| Protein | Vitamin E |
| Pyridoxine | Vitamin K |
| Rh Index | Zinc |
| Riboflavin | |
| Rough Ndf | |
| Rum Solsug | |

TABLE 4

Nutrients Suitable for Generating
a Nutritional Profile for Swine

Biotin
Cal/Phos
Choline

TABLE 4-continued

Nutrients Suitable for Generating
a Nutritional Profile for Swine

Coppr Add
Folic Acid
Iodine Add
Iron Add
Mang Add
Niacin
Pantotnc
Pyridoxine
Riboflavin
Salt
Selenium Add
Sodium
Sw Digphos
Thiamine
True Swine Digestible isoleucine
True Swine Digestible lysine
True Swine Digestible methionine
True Swine Digestible threonine
True Swine Digestible tryptophan
True Swine Digestible valine
V Calcium
V Phos
V Protein
Vit A
Vit D
Vit E
Vit K
Vitamin B12
Zinc

TABLE 5

Nutrients Suitable for Generating
a Nutritional Profile for Dairy Cattle

| | |
|---|---|
| Acid Detergent Fiber | Non-Protein Nitrogen |
| Biotin | Phosphorus |
| Calcium | Potassium |
| Chloride | Protein |
| Cobalt | Rumen Degradable Protein |
| Copper | Rumen Undegraded Alanine |
| Dietary Cation Anion Difference | Rumen Undegraded Histidine |
| Digestible Neutral Detergent Fiber | Rumen Undegraded Isoleucine |
| Dry Matter | Rumen Undegraded Leucine |
| Fat | Rumen Undegraded Lysine |
| Intestinally Digestible Arginine | Rumen Undegraded Methionine |
| Intestinally Digestible Histidine | Rumen Undegraded Phenylalanine |
| Intestinally Digestible Isoleucine | Rumen Undegraded Protein |
| Intestinally Digestible Leucine | Rumen Undegraded Tryptophan |
| Intestinally Digestible Lysine | Rumen Undegraded Valine |
| Intestinally Digestible Methionine | Salt |
| Intestinally Digestible Phenylalanine | Selenium |
| Intestinally Digestible Threonine | Sodium |
| Intestinally Digestible Tryptophan | Soluble Protein |
| Intestinally Digestible Valine | Soluble Sugar |
| Iodine | Starch |
| Iron | Sulfur |
| Magnesium | Verified Net Energy for Lactation |
| Manganese | Vitamin A |
| Neutral Detergent Fiber | Vitamin D |
| Neutral Detergent Fiber from Roughage | Vitamin E |
| Niacin | Zinc |
| Non Fiber Carbohydrates | |

Evaluation criteria are typically related to factors representative of animal productivity and reflect an aspect of production a producer would like to optimize. The present system allows a producer to select evaluation criteria (e.g. cost/gain, cost/output, animal production rate, and/or feed/gain) which fits the producer's production goals. For example, a dairy producer may focus on the cost of feed required to produce a unit of output (cost/output), whereas a pork producer may focus on cost/gain or rate of gain.

Examples of suitable animal production criteria which may be used as evaluation criteria in the generation of ration data include (i) animal production rate, (ii) the cost of feed per unit animal weight gain, and (iii) the feed weight per unit animal weight gain. The animal production rate may simply be a measure representative of the rate of weight gain of the animal in question (rate of gain). For example, a pork producer may wish to optimize rate of gain by selecting a feed which maximizes the rate at which a pig gains weight. This could be selected if a pig farmer was interested in turning over production as quickly as possible in a fixed asset which has limited space. The evaluation data may include data representative of the cost of feed required to produce a unit of weight gain of the animal ("cost/gain" basis). For example, a pork producer may wish to optimize cost/gain by selecting a feed which minimizes the feed cost required to make a pig gain a unit of weight. The evaluation data can include data representative of the amount of feed required to produce a unit of gain (feed/gain). For example, a producer may wish to optimize the feed/gain by selecting a feed which minimizes the amount of feed required to produce a unit of gain. A producer might select this criterion if they were faced with feed storage space constraints.

Examples of other suitable animal production rates which may be used as an evaluation criteria include rates of production of food products, such as milk or eggs, from the animal. Other suitable evaluation criteria include the cost of feed required to produce a unit of output of a particular animal product ("cost/output"). For example, a milk producer may wish to optimize the cost/output by selecting a feed which minimizes the cost of feed required to produce a unit of milk. In addition to utilizing evaluation data representative of only a single evaluation criteria, the present system may be capable of using evaluation data representative of a combination of two or more evaluation criteria in generating the ration data. For example, when considering an appropriate feed, a producer may wish to generate a custom feed based on the rate of production as well as cost of the feed (typically on a cost/gain basis).

Furthermore, the producer may choose to weight the relative contributions of two or more evaluation criteria. The system may include a data processing circuit which generates ration data based in part upon a weighted average of more than one evaluation criteria. In one specific embodiment, the system generates ration data based in part upon a 70:30 weighted average of two evaluation criteria (primary and secondary), such as a combination of cost of feed per unit animal weight gain and animal production rate. The system may also allow a user to alter the relative weighting accorded to the various evaluation criteria selected.

For instance, in the example referred to above, the producer may want to generate ration data using a combination of evaluation criteria that is weighted 70% on a cost/gain basis and 30% on a rate of animal weight gain basis. One method for providing such a weighted optimization analysis is to generate one solution for ration data using cost/gain as the sole evaluation criteria and generating a second for ration data using rate of animal weight gain as the sole evaluation criteria. Ration data which is representative of the weighted combined solution can be achieved by summing 70% of the amounts of ingredients from the cost/gain ration data set and 30% of the amounts of ingredients from the rate of gain ration data set. For example, in the instance where cost/gain ration data (generated solely on a cost/gain basis) includes 10% dehulled corn meal, and rate of gain ration data (generated solely on a rate of gain basis) includes 15% dehulled corn meal, if a producer chose cost/gain as the primary evaluation criteria the ingredient mix in the diet will include roughly 70% of the 10% dehulled corn meal requirement, and 30% of the 15% dehulled corn meal requirement summed to produce the amount of dehulled corn meal in the overall diet (i.e., circa 11.5% dehulled corn meal). This weighted summation is then repeated for all the amounts of ingredients present in the two custom diets generated by the two approaches. As one skilled in the art will recognize, there are other methods of generating ration data based on a weighted combination of evaluation criteria. The present system can also be configured to generate ration data based on other weightings of combinations of two or more evaluation criteria (e.g., two evaluation criteria weighted on either a 60:40 or 80:20 basis). In some embodiments of the present system, the weighting factors assigned to various evaluation criteria can themselves be input parameter(s) chosen by a producer to reflect the needs of his/her particular situation.

Figure 2:
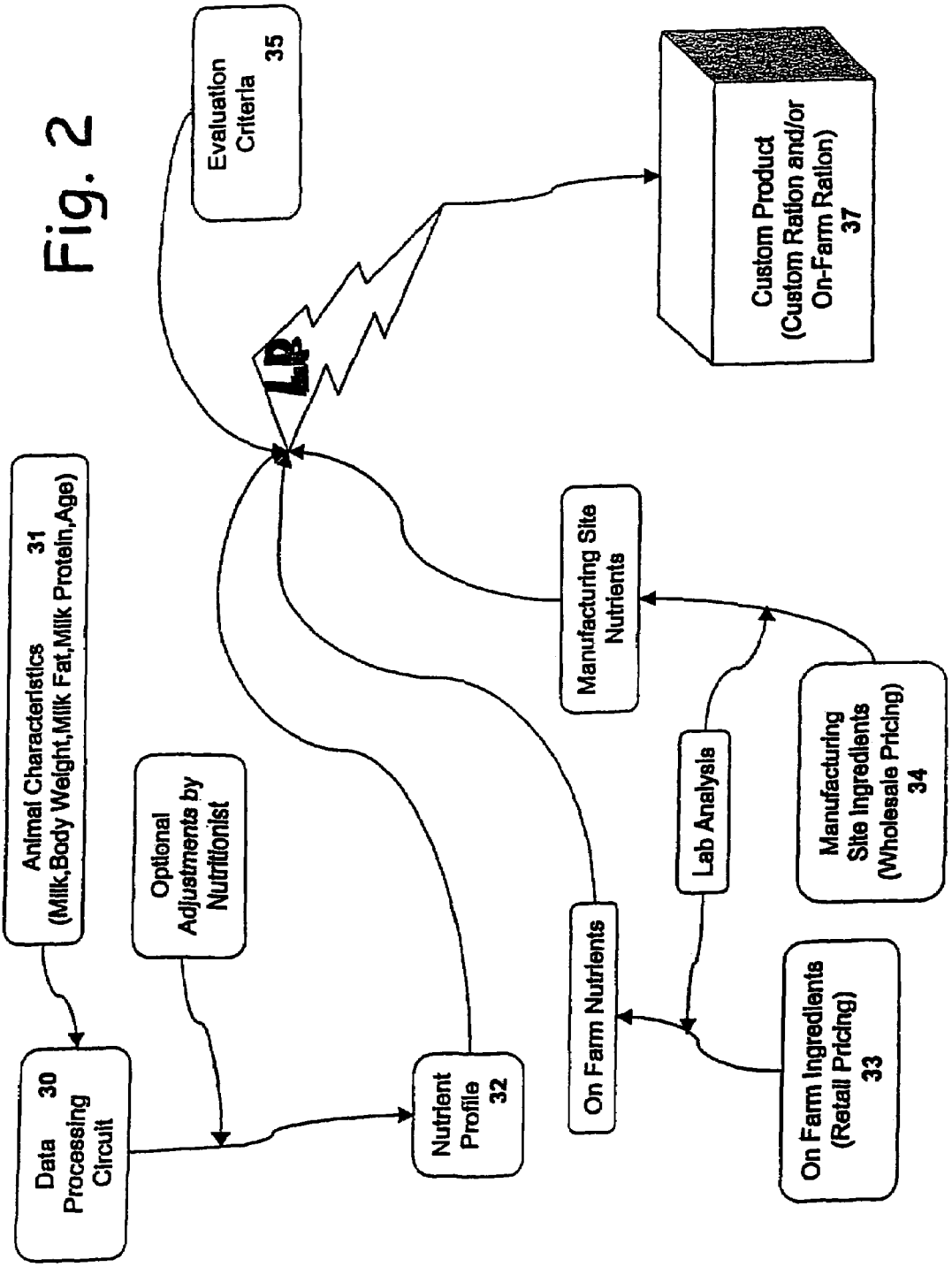
FIG. 2 is a general schematic representation of the data flow in another embodiment of the System which is designed to be used to generate a custom product ("Custom Ration") and/or feed mix from on-site ingredients ("On-Farm Ration") optimized for milk production and/or quality.

FIG. 2 depicts the general flow of data in one embodiment of the present system. The system shown in FIG. 2 includes a data processing circuit 30 configured to generate a nutrient profile 32 based on the animal data 31 and optional adjustments which may be provided by a nutritionist. Other data processing circuits generate lists of nutrient amounts associated with individual ingredients available at an on-farm site 33 and manufacturing site 34. A data processing circuit 36, which includes a linear program generates a custom product based on evaluation criteria 35. The linear program typically also generates the custom product solution based on pricing data associated with both the on-farm and manufacturing site ingredients. In one embodiment, retail and wholesale pricing information may be normalized to allow the linear program to facilitate consideration of potential ingredients with different types of associated prices as the basis for a solution to a single multivariable problem. The linear program is a mathematical model capable of solving problems involving a large number of variables limited by constraints using linear math functions. A variety of different linear programs capable of solving problems of this type are known to those of skill in the art. One example of a program of this type is commercially available from Format International as part of computer software system for solving complicated multivariable problems.

Memory portions of the systems which store animal data, evaluation data, and feed data representative of on-hand ingredients and/or mill ingredients are in communication with a data processing unit capable of generating ration data. The data processing unit can include a data processing circuit or a digital processing circuit. The memory portions which store the animal data, feed data for on-hand and mill ingredients, and evaluation data may be in communication with the data processing unit by inputted keyboard commands, mouse commands, a network connection with another computer, personal data assistants, via a modem connection, via an internet, or via an intranet.

Data processing circuit(s) which include the linear program can take input data (e.g., profile data, feed data, evaluation data and ingredient constraint data) as a basis to compute ration data. Ration data includes data specifying a combination of ingredients solution which is solved to fulfill a desired nutrient profile based on one or more evaluation criteria. Ration data generated by the present system generally includes data representative of the types and amounts of ingredients to be used to provide an overall custom diet for an animal. The ration data provided by the system generally also specifies a solution that is described in terms of a combination of types and amounts of ingredients from a first location (e.g., an on-farm location) and types and amounts of ingredients from at least one additional site (e.g., one or more supplier locations). Where the overall set of potential ingredients includes ingredients located at more than one location, the custom feed specified by the ration data may be made of ingredients located at either a single location or from more than one location. For example, the ration data may define a custom feed made up from ingredients located solely at supplier location or made up from ingredients located at both an on-farm location and a supplier location.

The ration data generally include custom feed data representative of a combination of amounts of the feed ingredients. The custom feed data may specify the type and corresponding amounts of the ingredients to be used in formulating the overall diet of an animal. This may be made up from a set of ingredients available at more than one location, e.g., from ingredients available at a producer's site and as well as ingredients available at a supplier location. The present system may also provide custom feed data which specifies the types and amounts of ingredients to be used from individual locations. For example, the custom feed data may include a listing of the types and amounts of ingredients available at a first location (e.g., on-farm ingredients) to be used to form a first feed mix and a listing of the types and amounts of ingredients available at a second location (e.g., ingredients available at a supplier location) to be used to form a second feed mix. In such instances, the custom feed data will typically also specify the amounts of the first and second feed mixes that are to be used to make up the overall custom diet for an animal.

The ration data typically includes amounts of a variety of types of ingredients. The actual ingredients available at any particular location can vary over time and will generally vary on a regional basis as well as reflect the type of animal feed that is typically produced and/or stored at the particular site. Commonly, the ration data include feed data representative of amounts of ingredients from a number of different ingredient categories, such as a grain source, a protein source, a vitamin source, a mineral source (e.g., a macro-mineral source and/or a trace mineral source) and/or a fat source. Table 6 includes a list of exemplary ingredients suitable for use in formulating custom feed mixes for a variety of animals. Tables 7, 8 and 9 include lists of ingredients which may be used in generating custom feed products for swine or dairy cattle.

TABLE 7

Ingredients Suitable for Use in Producing
a Custom Feed for a Finishing Diet for Swine Alimet
Bakery Product
Beet Pulp
Brewers Rice
Brown Sugar
Calcium Carb
Cane Sugar
Canola Meal
Cereal Fines
Cg Feed
Choline
Copper Sulfate
Corn - Ground Fine
Corn Gluten Meal
Corn Oil
Corn Starch
Dehydrated Alfalfa

TABLE 7-continued

Ingredients Suitable for Use in Producing
a Custom Feed for a Finishing Diet for Swine Distillers Grains With Soil
Dried Potato Waste
Dynasol
Fat
Fat Sprayed
Feather Meal
Feeding Rate
Fish Meal
Linseed Meal
L-Lysine HCl
Lt. Barley
L-Threonine
Malt Sprouts
Meat And Bone Meal
Menhaden Fish
Molasses
Mono-Dical Phos
Monosod Phos
Oat Mill Byproducts
Oat Mill Byproducts
Oats - Ground
Oats - Rolled
Pork Bloodmeal
Safflower Meal
Salt
Selenium
Soybean Hulls
Soybean Meal
Soybean Oil
Sunflower
Tryptosin
Wheat Midds

TABLE 8

Ingredients Suitable for Use in Producing
a Custom Feed for Breeding Swine

Alimet
Animal Fat
Ascorb Acid
Bakery Product
Bentonite
Blood Meal - Beef/Pork
Calcium Carbonate
Cereal Fines
Choline Chloride
Copper Sulfate
Corn Germ Meal
Corn Gluten Feed
Distillers Grains With Solubles
Dry Methionine Hydroxy Analog
Fish Meal
Malt Sprouts
Meat And Bone Meal; Pork Carcass
Methionine
Mineral Oil
Molasses-Cane
Mono-Dicalcium Phosphate
Oat Hulls
Red Flavor
Rice Bran
Salt
Selenium
Soybean Hulls
Threonine
Tryptophan
Vitamin E
Wheat Midds
Wheat Starch
Zinc Oxide
Zinc Sulfate

TABLE 9

Ingredients Suitable for Producing
a Custom Feed for Dairy Cattle

| | |
|---|---|
| Calcium Carbonate | Salt |
| Copper Sulfate | Selenium |
| Corn Gluten Meal | Sodium Sesquicarbonate |
| Fat | Soybean Hulls |
| Magnesium Oxide | Soybean Meal |
| Meat And Bone Meal, Pork | Trace Minerals |
| Mono-Dical Phos | Urea |
| Niacin | Vitamin-E |
| Pork Blood Meal | Wheat Midds |
| K/Mg/Sulfate | Zin-Pro |
| Yeast | |

When feeding animals, producers may not be able to satisfy nutritional requirements of the animals solely using on-hand ingredients (e.g., on-farm ingredients). To satisfy the animal's nutritional requirements, producers may desire to use on-hand ingredients in conjunction with a custom feed product made up of feed ingredients available from an outside supplier, such as a mill, feed mixer, and the like. The outside supplier will commonly have a range of ingredients available or on hand in their inventory (e.g., corn in various forms, soybean meal, wheat mids, barley, oats, animal fat, various vitamin supplements).

In addition to data specifying the types and amounts of ingredients to be used to provide the overall custom diet for an animal, the ration data generated by the present system can also include other data associated with the overall custom diet. Examples of such other data include cost data representative of a cost associated with the custom feed data, feed weight data representative of a feed weight associated with the custom feed data, and performance data representative of projected animal performance associated with the custom feed data. For example, Table 10 below lists a number of categories of ration data that may be useful in assisting a producer and/or supplier in evaluating a custom feed with respect to productivity, animal performance and cost effectiveness. The availability of these types of information can provide a producer and/or supplier with additional information concerning the effects of variations in dietary composition on factors such as cost, volume of feed, wastage and animal performance. As with the listing(s) of the types and amounts of ingredients, the cost data and feed weight data can be representative of costs and feed weights associated with the overall custom diet and/or with feed mix(es) to be provided from individual locations.

TABLE 10

Illustrative Categories of Ration Data
Associated with a Custom Feed for Swine

| | |
|---|---|
| End Weight | Lean Gain |
| Days in Phase | Lean % |
| Avg Daily Gain | Effective Ambient Temp |
| Avg Daily Feed Intake | Cost of Gain |
| Total Feed Consumed | Total Cost per phase |
| Feed/Gain | |

Figure 3:
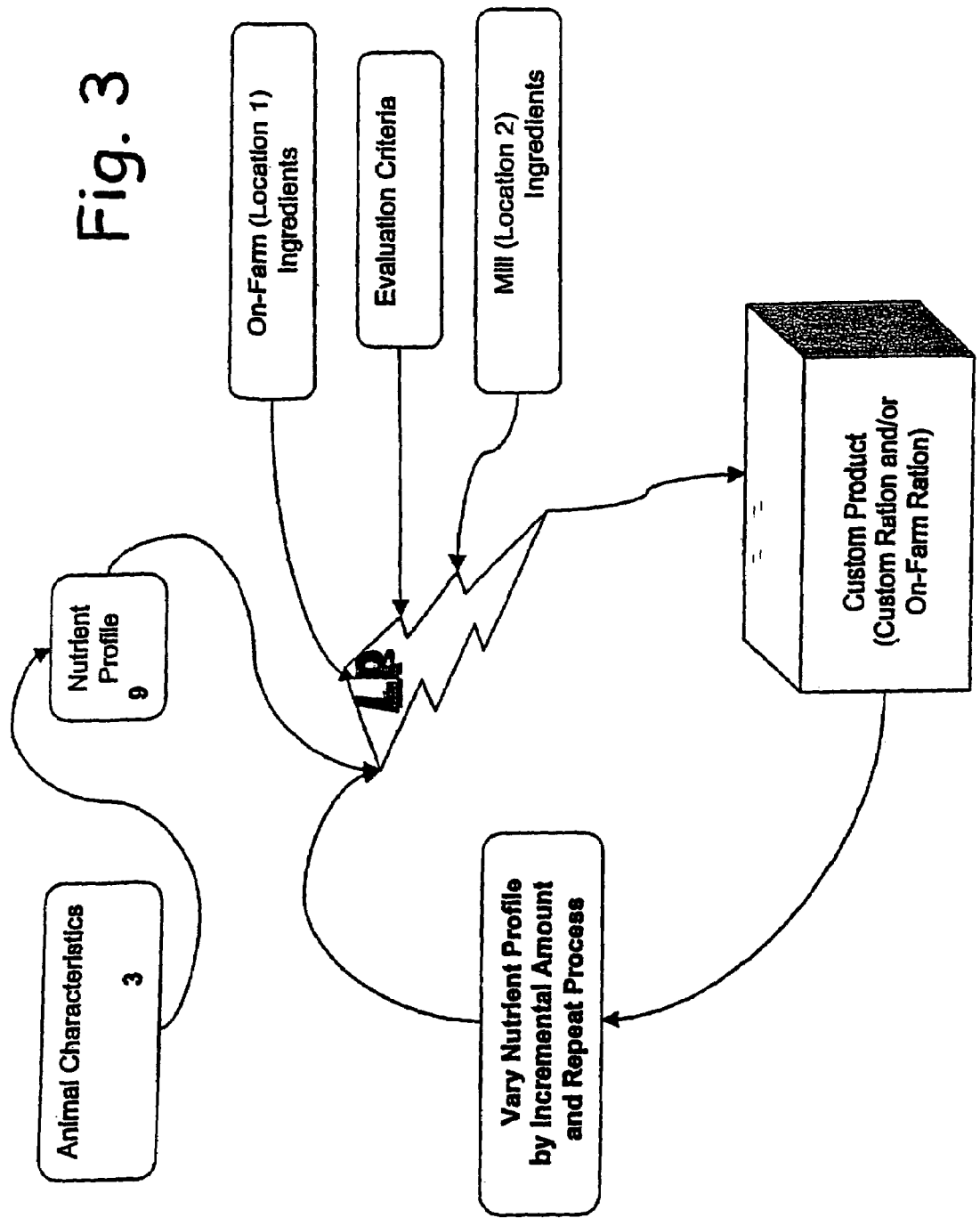
FIG. 3 is a general schematic representation of the data flow in a variation of the System shown in FIG. 1.

In other variations of the embodiments described herein, the systems and/or methods may also include a memory portion in communication with the digital processor which stores variation data representative of a range for one or more nutrient components of the nutrient profile. The digital processor is capable of generating a set of ration data based upon the variation data. The memory portion may store variation data which correspond to preselected incremental variations for the values assigned to one or more individual nutrients in the nutritional profile. For example, memory portion may store variation data which correspond to preselected incremental positive and negative variations of the values assigned to two individual nutrients, such as true digestible lysine and net energy. The digital processor would generate ration data corresponding to each of the eight possible additional combinations of values for the two specified nutrients. Together with the ration data associated with the original nutritional profile, the resulting set of nine ration data corresponding to the various combinations of values for each specified nutrient (original value, original value plus an increment; original value minus an increment) would make up a three by three matrix of ration data. One example of this approach is illustrated in Table 11 below. A general approach to generating a set of ration data based upon variation data is depicted schematically in FIG. 3. The determination of ration data for the center point in the matrix ("Ration Data 5") corresponds to the solution generated by the data processing circuit based on the nutrient profile. In the example shown in Table 11, the nutrient profile has values of 0.90% for true digestible lysine and 2150 kcal/kg for net energy. Each of the eight other ration data in the set depicted in Table 11 corresponds to a ration data generated for a modified nutrient profile in which the value for at least one nutrient has been varied by a specified increment. For example, Ration Data 1 represents ration data associated with a modified nutrient profile has values of 0.95% for true digestible lysine and 2100 kcal/kg for net energy. Ration Data 6 represents ration data associated with a modified nutrient profile in which only the value for true digestible lysine (0.85%) has been varied from the values in the nutrient profile. The generation of such a matrix can facilitate an evaluation of the effect of incremental variations in amounts of specified nutrient(s) on the assessment of optimum ration data for a given evaluation criteria.

TABLE 11

| | | True Digestible Lysine | | |
|---|---|---|---|---|
| | | 0.95% | 0.90% | 0.85% |
| Net Energy (kcal/kg) | 2100 | Ration Data 1 | Ration Data 2 | Ration Data 3 |
| | 2150 | Ration Data 4 | Ration Data 5 | Ration Data 6 |
| | 2200 | Ration Data 7 | Ration Data 8 | Ration Data 9 |

The invention has been described with reference to various specific and illustrative embodiments and techniques. However, it should be understood that many variations and modifications may be made while remaining within the spirit and scope of the invention.

TABLE 6

Exemplary Ingredients Suitable for
Use in Formulating Custom Feed Mixes

Acidulated Soap Stocks
Active Dry Yeast
Alfalfa Meal
Alfalfa-Dehydrated
Alimet
Alka Culture
Alkaten
Almond Hulls
Ammonium Chloride
Ammonium Lignin
Ammonium TABLE 6-continued Exemplary Ingredients Suitable for
Use in Formulating Custom Feed Mixes Polyphosphate
Ammonium Sulfate
Amprol
Amprol Ethopaba
Anhydrous Ammonia
Appetein
Apramycin
Arsanilic Acid
Ascorb Acid
Aspen Bedding
Availa
Avizyme
Bacitracin Zinc
Bakery Product
Barley
Barley-Crimped
Barley-Ground
Barley-Hulless
Barley-Hulls
Barley-Midds
Barley-Needles
Barley-Rolled
Barley-St. Bon.
Barley-Whole
Barley-With Enzyme
Baymag
Beef Peanut Hulls
Beef Peanut Meal
Beet
Beet Pulp
Biotin
Biscuit By Product
Black Beans
Blood-Flash Dry
Blueprint Rx
Bone Meal
Brewers Rice
Brix Cane
Buckwheat
Bugs
Cage Calcium
Calcium Cake
Calcium Chloride
Calcium Formate
Calcium Iodate
Calcium Sulfate
Calciun Prop
Calf Manna
Canadian Peas
Cane-Whey
Canola Cake
Canola Fines
Canola Meal
Canola Oil
Canola Oil Blender
Canola Oil Mix
Canola Screenings
Canola-Whole
Carbadox
Carob Germ
Carob Meal
Cashew Nut By Product
Catfish Offal Meal
Choline Chloride
Chromium Tripicolinate
Citrus Pulp
Clopidol
Cobalt
Cobalt Carbonate
Cobalt Sulfate
Cocoa Cake
Cocoa Hulls
Copper Oxide
Copper Sulfate
Corn Chips
Corn Chops

TABLE 6-continued

Exemplary Ingredients Suitable for Use in Formulating Custom Feed Mixes

Corn Coarse Cracked
Corn-Coarse Ground
Corn Cob-Ground
Corn Distillers
Corn Flint
Corn Flour
Corn Germ Bran
Corn Germ Meal
Corn Gluten
Corn-High Oil
Corn Kiblets
Corn Meal Dehulled
Corn Oil
Corn Residue
Corn Starch
Corn/Sugar Blend
Corn-Cracked
Corn-Crimped
Corn-Ground Fine
Corn-Ground Roasted
Corn-Steam Flaked
Corn-Steamed
Corn-Whole
Cottonseed Culled
Cottonseed Hull
Cottonseed Meal
Cottonseed Oil
Cottonseed Whole
Coumaphos
Culled Beans
Danish Fishmeal
Decoquinate
Dextrose
Diamond V Yeast
Disodium Phosphate
Distillers Grains
Dried Apple Pomace
Dried Brewers Yeast
Dried Distillers Milo
Dried Porcine
Dried Whole Milk Powder
Duralass
Enzyme Booster
Epsom Salts
Erythromycin
Extruded Grain
Extruded Soy Flour
Fat
Feather Meal
Feeding Oatmeal
Fenbendazole
Fermacto
Ferric Chloride
Ferrou Cabonate
Ferrous Carbonate
Ferrous Sulfate
Fine Job's Tear Bran
Fish Meal
Fish
Flavoring
Folic Acid
French Fry Rejects
Fresh Arome
Fried Wheat Noodles
Gold Dye
Gold Flavor
Grain Dust
Grain Screening
Granite Grit
Grape Pomace
Green Dye
Green Flavor
Guar Gum
Hard Shell
Hemicellulose Extract

TABLE 6-continued

Exemplary Ingredients Suitable for Use in Formulating Custom Feed Mixes

Hemp
Herring Meal
Hominy
Hygromycin
Indian Soybean Meal
Iron Oxide-Red
Iron-Oxide Yellow
Job's Tear Broken Seeds
Kapok Seed Meal
Kelp Meal
Kem Wet
Lactose
Larvadex
Lasalocid
Levams Hcl
Limestone
Linco
Lincomix
Lincomycin
Linseed Meal
Liquid Fish Solubles
Lupins
Lysine
Magnesium
Magnesium Sulfate
Malt Plant By-Products
Manganous Ox
Maple Flavor
Masonex
Meat And Bone Meal
Meat And Bone Meal
Meat Meal
Mepron
Methionine
Millet Screenings
Millet White
Millet-Ground
Milo Binder
Milo-Coarse Ground
Milo-Cracked
Milo-Whole
Mineral Flavor
Mineral Oil
Mixed Blood Meal
Molasses
Molasses Blend
Molasses Dried
Molasses Standard Beet
Molasses Standard Cane
Molasses-Pellet
Mold
Monensin
Monoamonum Phos
Monosodium Glutamate
Monosodium Phosphate
Mung Bean Hulls
Mustard Meal High Fat
Mustard Oil
Mustard Shorts
Narasin
Natuphos
Niacin
Nicarbazin
Nitarsone
Oat Cullets
Oat Flour
Oat Groats
Oat Hulls
Oat Mill Byproducts
Oat Screenings
Oat Whole Cereal
Oatmill Feed
Oats Flaked
Oats-Ground
Oats-Hulless
Oats-Premium

TABLE 6-continued

Exemplary Ingredients Suitable for Use in Formulating Custom Feed Mixes

- Oats-Rolled
- Oats-Whole
- Oyster Shell
- Paddy Rice
- Palm Kernel
- Papain
- Papain Enzyme
- Paprika Spent Meal
- Parboiled Broken Rice
- Pea By-Product
- Pea Flour
- Peanut Meal
- Peanut Skins
- Pelcote Dusting
- Phosphate
- Phosphoric Acid
- Phosphorus
- Phosphorus Defluorinated
- Pig Nectar
- Plant Waste
- Poloxalene
- Popcorn
- Popcorn Screenings
- Porcine Plasma; Dried
- Pork Bloodmeal
- Porzyme
- Posistac
- Potassium Bicarbonate
- Potassium Carbonate
- Potassium Magnesium Sulfate
- Potassium Sulfate
- Potato Chips
- Poultry Blood/Feather Meal
- Poultry Blood Meal
- Poultry Byproduct
- Predispersed Clay
- Probios
- Procain Penicillen
- Propionic Acid
- Propylene Glycol
- Pyran Tart
- Pyridoxine
- Quest Anise
- Rabon
- Rapeseed Meal
- Red Flavor
- Red Millet
- Riboflavin
- Rice Bran
- Rice By-Products Fractions
- Rice Dust
- Rice Ground
- Rice Hulls
- Rice Mill By-Product
- Rice Rejects Ground
- Roxarsone
- Rumen Paunch
- Rumensin
- Rye
- Rye Distillers
- Rye With Enzymes
- Safflower Meal
- Safflower Oil
- Safflower Seed
- Sago Meal
- Salinomycin
- Salt
- Scallop Meal
- Seaweed Meal
- Selenium
- Shell Aid
- Shrimp Byproduct
- Silkworms
- Sipernate
- Sodium Acetate
- Sodium Benzoate
- Sodium Bicarbonate
- Sodium Molybdate
- Sodium Sesquicarbonate
- Sodium Sulfate
- Solulac
- Soweena
- Soy Flour
- Soy Pass
- Soy Protein Concentrate
- Soybean Cake
- Soybean Curd By-Product
- Soybean Dehulled Milk By-Product
- Soybean Hulls
- Soybean Mill Run
- Soybean Oil
- Soybean Residue
- Soybeans Extruded
- Soybeans-Roasted
- Soycorn Extruded
- Spray Dried Egg
- Standard Micro Premix
- Starch Molasses
- Steam Flaked Corn
- Steam Flaked Wheat
- Sugar (Cane)
- Sulfamex-Ormeto
- Sulfur
- Sulfur
- Sunflower Meal
- Sunflower Seed
- Tallow Fancy
- Tallow-Die
- Tallow-Mixer
- Tapioca Meal
- Tapioca Promeance
- Taurine
- Terramycin
- Thiabenzol
- Thiamine Mono
- Threonine
- Tiamulin
- Tilmicosin
- Tomato Pomace
- Trace Min
- Tricalcium Phosphate
- Triticale
- Tryptophan
- Tryptosine
- Tuna Offal Meal
- Tylan
- Tylosin
- Urea
- Vegetable Oil Blend
- Virginiamycin
- Vitamin A
- Vitamin B Complex
- Vitamin B12
- Vitamin D3
- Vitamin E
- Walnut Meal
- Wheat Bran
- Wheat Coarse Ground
- Wheat Germ Meal
- Wheat Gluten
- Wheat Meal Shredded
- Wheat Millrun
- Wheat Mix
- Wheat Noodles Low Fat
- Wheat Red Dog
- Wheat Starch TABLE 6-continued Exemplary Ingredients Suitable for
Use in Formulating Custom Feed Mixes Wheat Straw
Wheat With Enzyme
Wheat-Ground
Wheat-Rolled
Wheat-Whole
Whey Dried
Whey Permeate
Whey Protein
Concentrate
Whey-Product Dried
Yeast Brewer Dried
Yeast Sugar Cane
Zinc
Zinc Oxide
Zoalene

What is claimed is:

1. A system for determining customized feed for at least one animal, the system comprising:
a first memory portion configured to store animal data representative of the characteristics of the animal;
a second memory portion configured to store feed data representative of the feed ingredients located at at least one location;
a third memory portion configured to store evaluation data representative of at least two evaluation criteria;
a data processing circuit in communication with the memory portions and configured to generate nutrient profile data representative of a nutrient profile for the animal based upon the animal data, the data processing circuit being further configured to generate ration data representative of a combination of ingredients from the at least one location, the ration data being generated by the data processing circuit based upon the profile data, the feed data and the evaluation data; and
a fourth memory portion in communication with the data processing circuit and configured to store optimization weighting data representative of the effect a respective evaluation criteria has on the generation of the ration data, the data processing circuit further generating the ration data based upon the optimization weighting data.

2. The system of claim 1, wherein the animal data is representative of at least one of a beginning weight of the animal; a desired weight of the animal; an environment of the animal; a feed form; an actual or desired production level of the animal; and a relationship of animal muscle to fat of the animal.

3. The system of claim 1, wherein the feed ingredients include at least one of a grain source, a protein source, a vitamin source, a mineral source and a fat source.

4. The system of claim 3, wherein the animal data is representative of at least one of a beginning weight of the animal; a desired weight of the animal; an environment of the animal; a feed form; an actual or desired production level of the animal; and a relationship of animal muscle to fat of the animal.

5. The system of claim 4, wherein the evaluation criteria include at least two of (i) animal production rate, (ii) the cost of feed per unit animal weight gain, and (iii) the feed weight per unit animal weight gain.

6. The system of claim 5, wherein the feed ingredients include at least one of a grain source, a protein source, a vitamin source, a mineral source and a fat source.

7. The system of claim 5, wherein the animal production rate is at least one of a milk production rate, an egg production rate and a rate of lean weight gain.

8. The system of claim 1, wherein the optimization weighting data may be selected to cause one of the evaluation criteria to have no effect on the generation of the ration data.

9. The system of claim 1, wherein the memory portions are portions of a digital memory and a parallel data bus is coupled between the digital memory and the data processing circuit to facilitate communication therebetween.

10. The system of claim 1, wherein the memory portions are portions of a plurality of digital memories and a network couples the digital memories to the data processing circuit to facilitate communication therebetween.

11. The system of claim 1, wherein the nutrient profile data is representative of at least two nutrient components, and the system further includes a fifth memory portion in communication with the digital processor, the fifth memory portion storing variation data representative of a range for the nutrient components of the nutrient profile and the digital processor generates a set of ration data based upon the variation data.

12. The system of claim 11, wherein the nutrient components include at least true digestible lysine and net energy.

13. The system of claim 1, wherein the feed data includes an amount for each feed ingredient.

14. The system of claim 13, wherein the amount for each feed ingredient can be constrained according to one or more criteria.

15. The system of claim 14, wherein the amount of each feed ingredient can be constrained according to at least two criteria.

16. The system of claim 1, wherein the animal data includes an animal characteristic related to at least one of an environment, a current condition, a desired final condition, a genotype, a feed form, a current production level and a desired production level.

17. The system of claim 1, wherein the at least one animal is one or more cattle, swine, poultry, fish, or crustaceans.

18. The system of claim 1, wherein the animal data includes a parameter related to an animal production level.

19. The system of claim 1, wherein the animal data includes a parameter related to an animal genotype.

20. The system of claim 1, wherein the animal data includes a parameter related to an animal environment.

21. The system of claim 1, wherein the animal data includes a parameter related to an animal feeding regime.

22. The system of claim 1, wherein the feed data includes supplier feed data representative of sets of ingredients located at a supplier site and on-farm feed data representative of sets of ingredients located at an on-farm site,
wherein the on-farm feed data include data representative of costs and amounts of ingredients located at the on-farm site.

23. The system of claim 1, wherein the evaluation criteria include at least one of cost/gain, cost/output, animal production rate, and feed/gain.

24. The system of claim 1, wherein the evaluation criteria include data representative of an amount of feed required to produce a unit of gain.

25. The system of claim 1, wherein the evaluation criteria include data representative of a rate of weight gain of an animal.

26. The system of claim 1, wherein the evaluation criteria include data representative of a cost of feed required to produce a unit of weight gain of an animal.

27. The system of claim 1, wherein the ration data include data representative of a cost associated with the ration data, data representative of a feed weight associated with the ration data, and data representative of projected animal performance associated with the ration data.

28. A system for determining customized feed for at least one animal, the system comprising:
- first memory means for storing animal data representative of the characteristics of the animal;
- second memory means for storing feed data representative of the feed ingredients located at at least one location;
- third memory for storing evaluation data representative of at least two evaluation criteria;
- processing means for generating profile data representative of a nutrient profile for the animal based upon the animal data, processing means further generating ration data representative of a combination of ingredients from the location, the ration data being generated by the processing means based upon the profile data, the feed data and the evaluation data; and
- fourth memory means for storing optimization weighting data representative of the effect a respective evaluation criteria has on the generation of the ration data, the processing means further generating the ration data based upon the optimization weighting data.

29. The system of claim 28, wherein the animal data is representative of at least one of a beginning weight of the animal; a desired weight of the animal; an environment of the animal; a feed form; an actual or desired production level of the animal; and a relationship of animal muscle to fat of the animal and the feed ingredients include at least one of a grain source, a protein source, a vitamin source, a mineral source and a fat source.

30. The system of claim 28, wherein the evaluation criteria include at least two of (i) animal production rate, (ii) the cost of feed per unit animal weight gain, and (iii) the feed weight per unit animal weight gain.

31. The system of claim 30, wherein the feed ingredients include at least one of a grain source, a protein source, a vitamin source, a mineral source and a fat source.

32. A method for determining customized feed for at least one animal, the method comprising:
- storing animal data representative of the characteristics of the animal;
- storing feed data representative of the feed ingredients located at at least one location;
- storing evaluation data representative of at least two evaluation criteria;
- storing optimization weighting data representative of the effect a respective evaluation criteria;
- generating profile data representative of a nutrient profile for the animal based upon the animal data; and
- generating ration data representative of a combination of ingredients from the location, the ration data being generated based upon the profile data, the feed data, the evaluation data, and the optimization weighting data.

33. The method of claim 32, wherein the feed data includes an amount for each feed ingredient.

* * * * *